United States Patent [19]
Tu et al.

[11] Patent Number: 5,988,779
[45] Date of Patent: Nov. 23, 1999

[54] DOCUMENT TRAY OF OPTICAL SCANNER

[75] Inventors: Hsin-Hung Tu; Hsien-Che Hung, both of Hsinchu, Taiwan

[73] Assignee: Mustek Systems Inc., Hsinchu, Taiwan

[21] Appl. No.: 09/128,984

[22] Filed: Aug. 3, 1998

[30] Foreign Application Priority Data

Aug. 7, 1997 [TW] Taiwan ................................. 86213352

[51] Int. Cl.$^6$ ................................................. A47B 81/00
[52] U.S. Cl. ....................................... 312/291; 312/348.5
[58] Field of Search ..................................... 312/301, 193, 312/291, 348.5, 330.1; 271/162, 163, 164, 145

[56] References Cited

U.S. PATENT DOCUMENTS

| | | | |
|---|---|---|---|
| 1,425,559 | 8/1922 | Wampach et al. | 312/348.5 |
| 2,479,752 | 8/1949 | Lohr | 312/348.5 |
| 5,746,528 | 5/1998 | Mayer et al. | 271/164 X |
| 5,831,823 | 11/1998 | Hoedl . | |

*Primary Examiner*—Anthony Knight
*Assistant Examiner*—Karlena D. Schwing
*Attorney, Agent, or Firm*—W. Wayne Liauh

[57] ABSTRACT

An improved document tray for scanners includes a supporting part and covering means. The supporting part is used to hold a document for scanning and the covering means is used to press and fix the document. The covering members does not need to be opened for inserting a document into the supporting part. The document tray of the invention indeed improves the drawbacks of the prior art so that the tray will not jam or be damaged when it is pushed into the scanner.

6 Claims, 6 Drawing Sheets

DOCUMENT TRAY OF OPTICAL SCANNER

BACKGROUND OF THE INVENTION

1. Field of the Invention

This invention relates to a document tray of an optical scanner, especially to covering means of the document tray that does not need to be opened but can fix the document inserted into the supporting part of the document tray.

2. Description of Related Art

With the growing development of opto-electronic technology, scanners have been commonly used in our daily life. There are scanners of desktop, handy and feedback types. Regarding the built-in scanner, a document is put in its tray in order to start the scanning process. Consequently, it is a very essential condition that the document could be properly pressed and fixed in the tray during the scanning work. The situation is the same as for the desktop and built-in scanners. The covering means of the prior art includes a switch that engages it to the supporting part, and the switch has to be pressed every time when users want to load and unload a document into or from the supporting part. In addition, users may not open the covering means totally concerning that the covering means may break off with constant use and this will influence the time spent on loading and unloading documents for the covering means may fall down. Also, if the switch is not properly pressed to close the covering means, the tray may cause a jam condition when the tray is pushed into the scanner. Other covering means of the prior art, which is opened through vertical sides of scanner, have the same jam condition when the tray is pushed into.

SUMMARY OF THE INVENTION

The objective of the invention is to provide a document tray of built-in scanners that solves the above-mentioned problem.

With the problem of the prior art in mind, the document tray of the invention includes a supporting part and covering means. With the covering means of the invention, users load and unload a document into and from the tray without opening the covering means. Since the covering means of the invention has no switch, the tray will not jam or be damaged when it is pushed into the scanner. In addition, the tray of the invention is transparent for scanning.

BRIEF DESCRIPTION OF THE DRAWINGS

Other objects, features, and advantages of the invention will become apparent from the following detailed description of the preferred and non-limiting embodiments. The description is made with reference to the accompanying drawings in which.

DETAILED DESCRIPTION OF THE INVENTION

Figure 1:
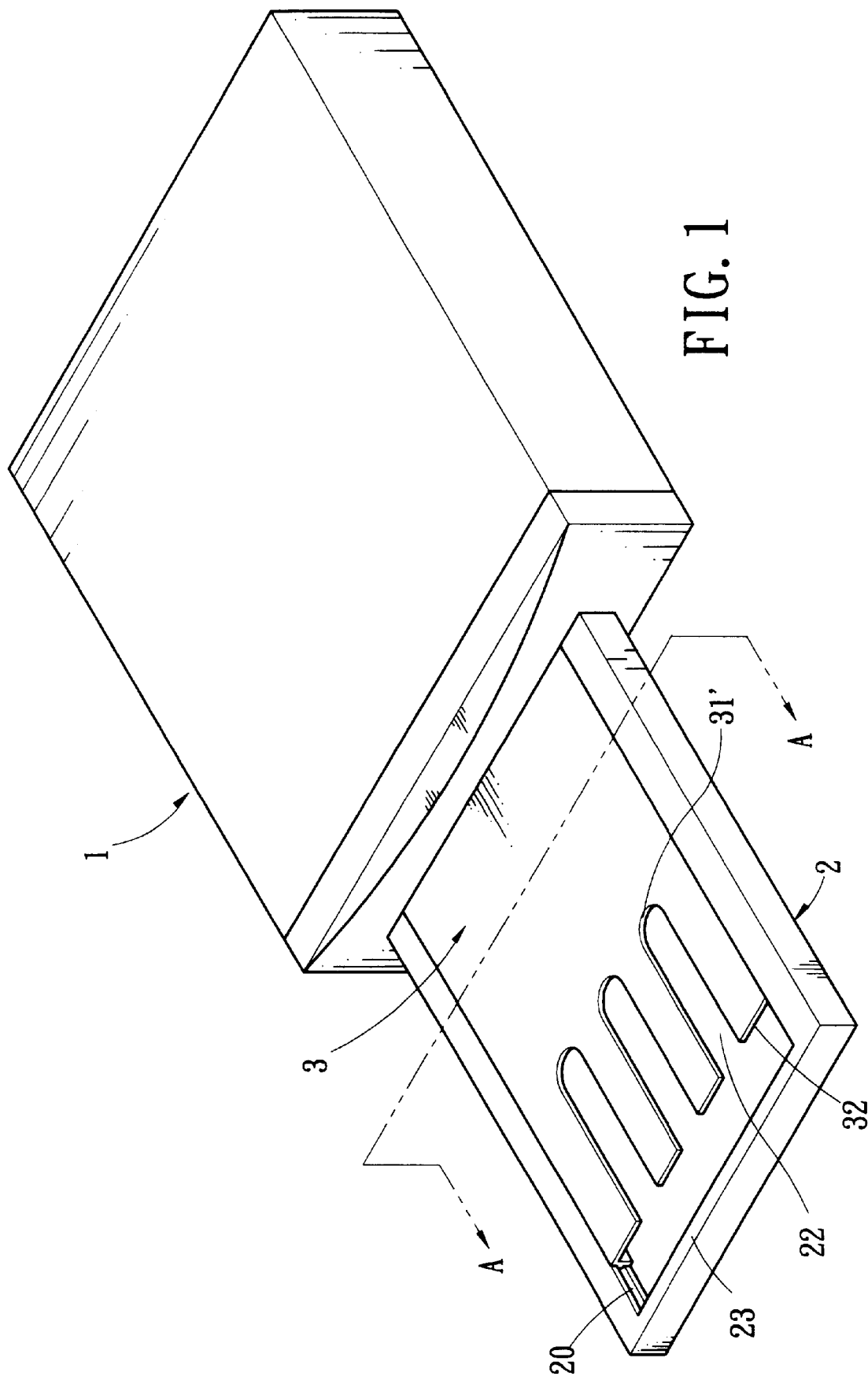
FIG. 1 is the perspective view of a scanner with a document tray.

Please refer to FIG. 1 which is the perspective view of a scanner of the invention with a document tray. The scanner of the invention includes a main body 1 and a document tray including a supporting part 2 and covering means 3. Though not shown in figure, the main body 1 includes a drive device, a controller, and a scan device. The scan device has a light source, a detector, and an optical module. The supporting part 2 is used to hold a document that needs to be scanned and is pushed into or pulled out from the main body 1 by the drive device. In order to scan the document loaded in the supporting part 2, the supporting part 2 is made of a transparent material. The covering means 3 is used to press and fix the document. In addition, the covering means 3 is inseparably engaged with the supporting part 2, or the covering means 3 is mounted to the supporting part 2 by a screw where the covering means 3 and the support tray 2 are separable for cleaning the document tray. In the following description, three preferred embodiments of the document tray of the invention are shown.

Figure 2:
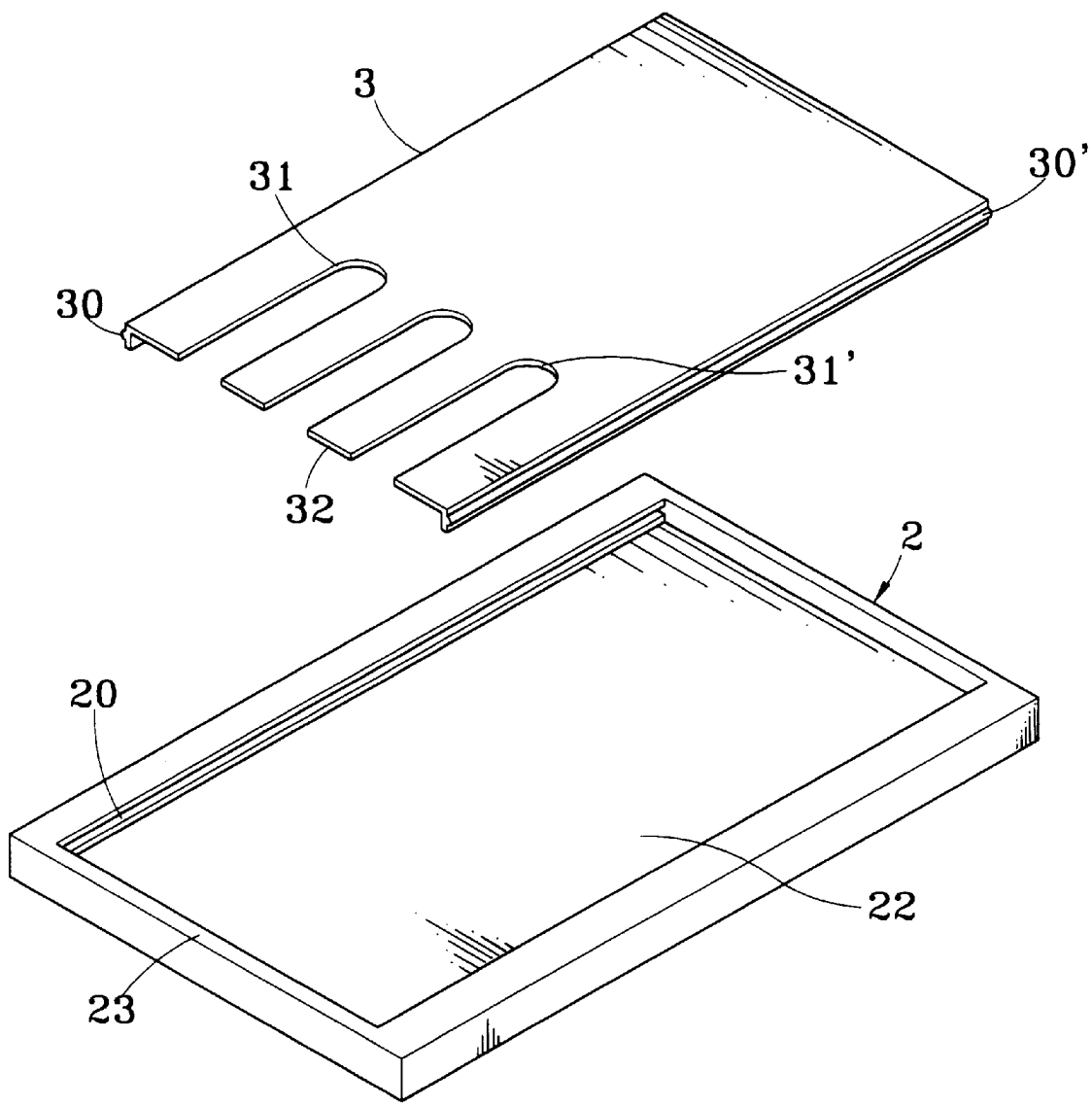
FIG. 2 is the perspective view of the first embodiment of the invention.
Figure 3:
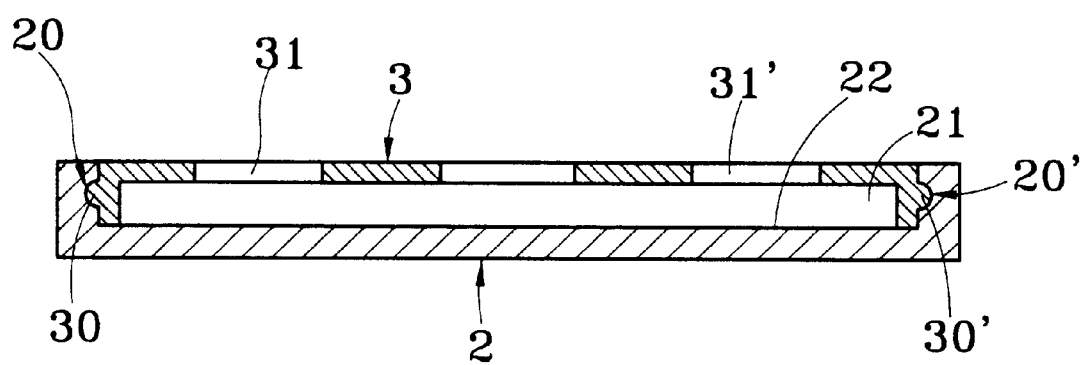
FIG. 3 is the cross-section view of the document tray shown in FIG. 1.
Figure 4:
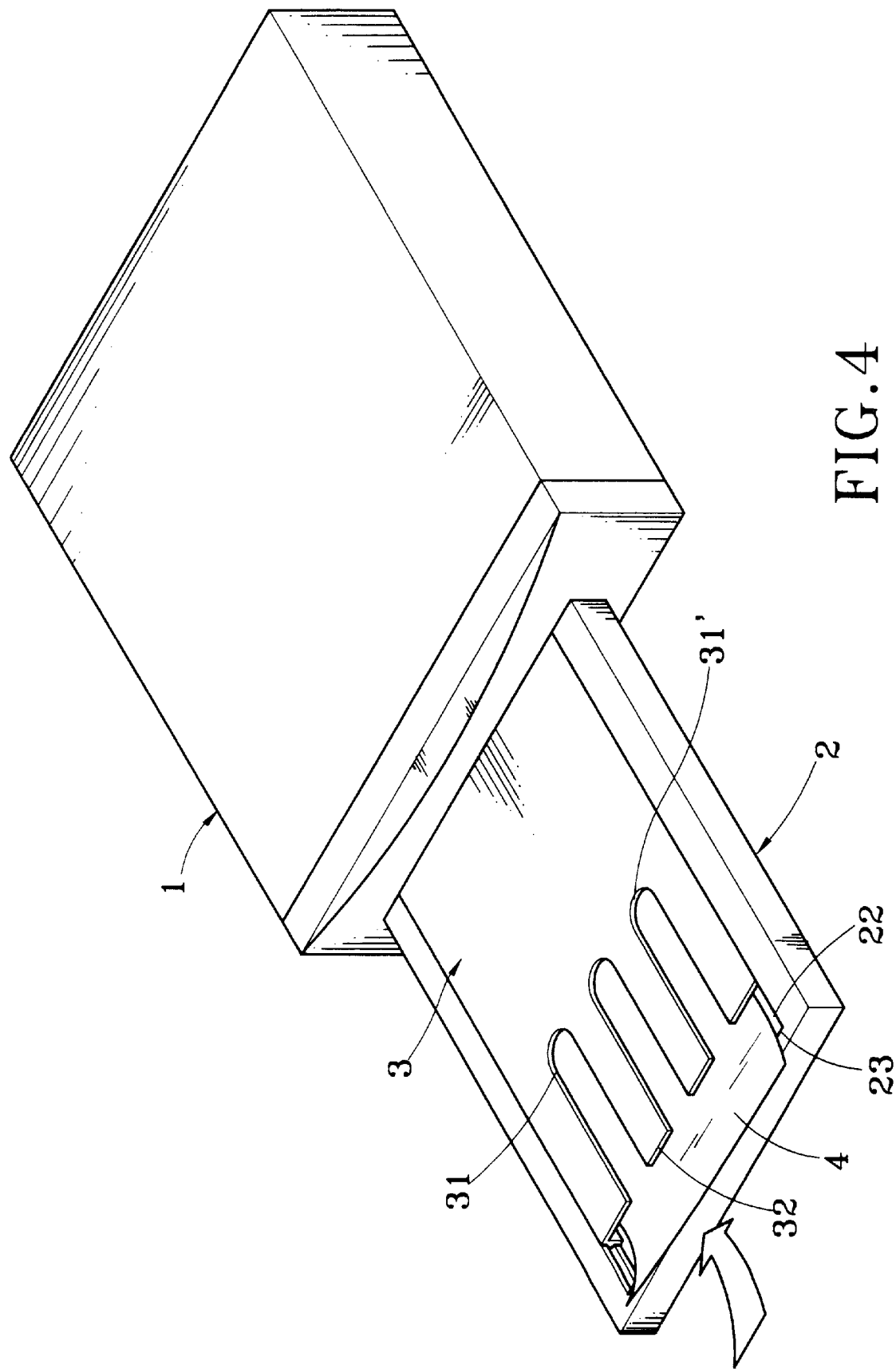
FIG. 4 is the perspective view of the document tray with document sheets shown in FIG. 1.

Please refer to FIG. 2 which is the perspective view of the first embodiment of the invention. The covering means 3 of the document tray is a plank with salients 30 and 30' at left and right sides of the covering means 3, respectively. With the salient 30 and 30', the covering means 3 can be mounted to or dismounted from the supporting part 2 of the document tray. Please refer to FIG. 3. The salients 30 and 30' are engaged with the recesses 20 and 20' at left and right inner sides of the tray 2. There is a space 21 between the covering means 3 and the bottom 22 of the supporting part 2. Although the space 21 must be large enough to contain a document 4 (as shown in FIG. 4) such as a photography, the space 21 is made as small as possible in order to fix the document 4 tightly. In addition, the covering means 3 includes a plurality of slots such as the U-shape cut-off 31 and 31' The size of the U-shape cut-off 31 and 31' is larger than the usual width of the users' fingers in order to put the document 4 into the document tray. Between the front end 32 of the covering means 3 and the front end 23 of the supporting part 2, there is a gap for inserting the document 4.

Figure 5:
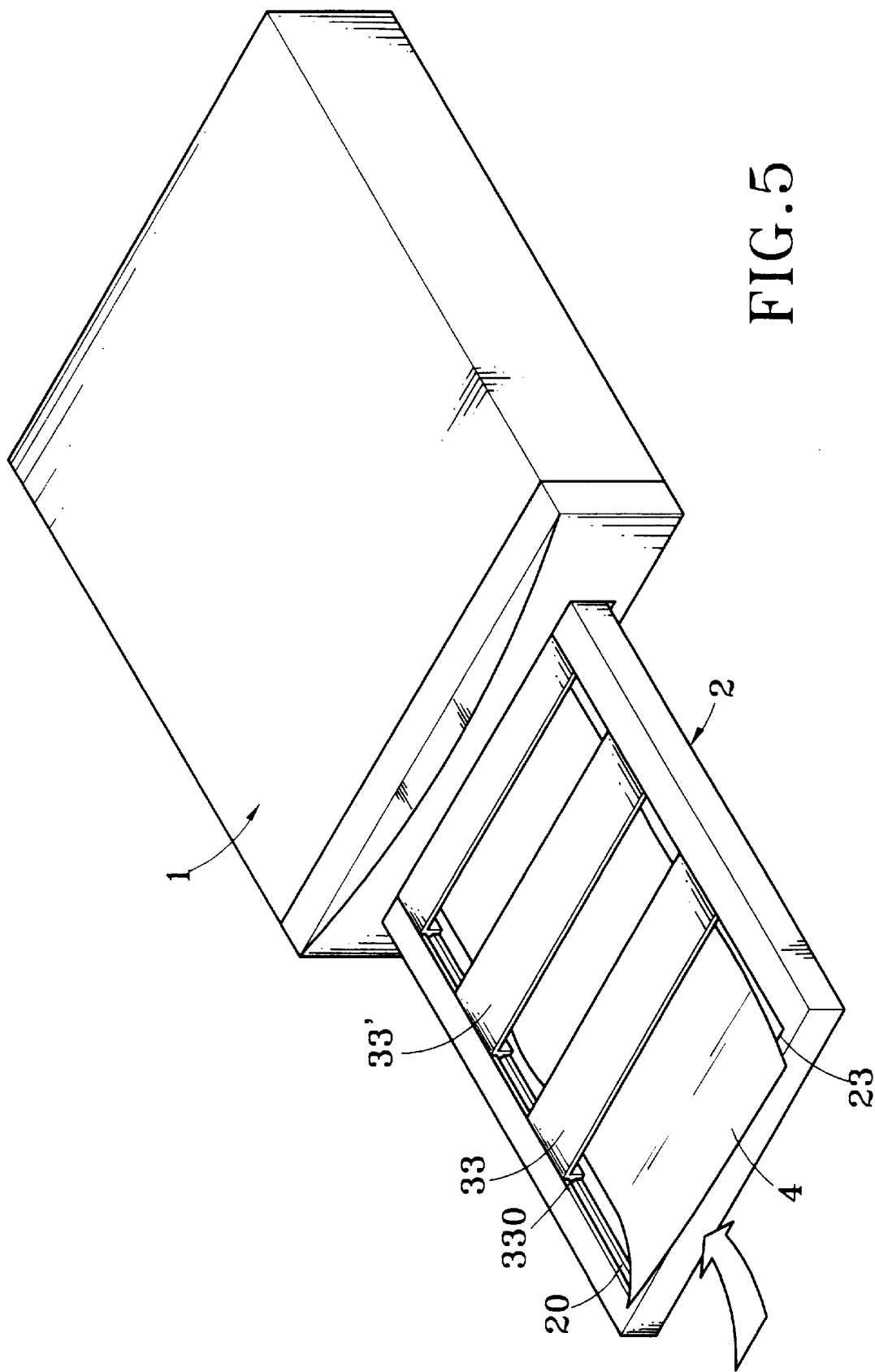
FIG. 5 is the perspective view of the second embodiment of the invention.
Figure 6:
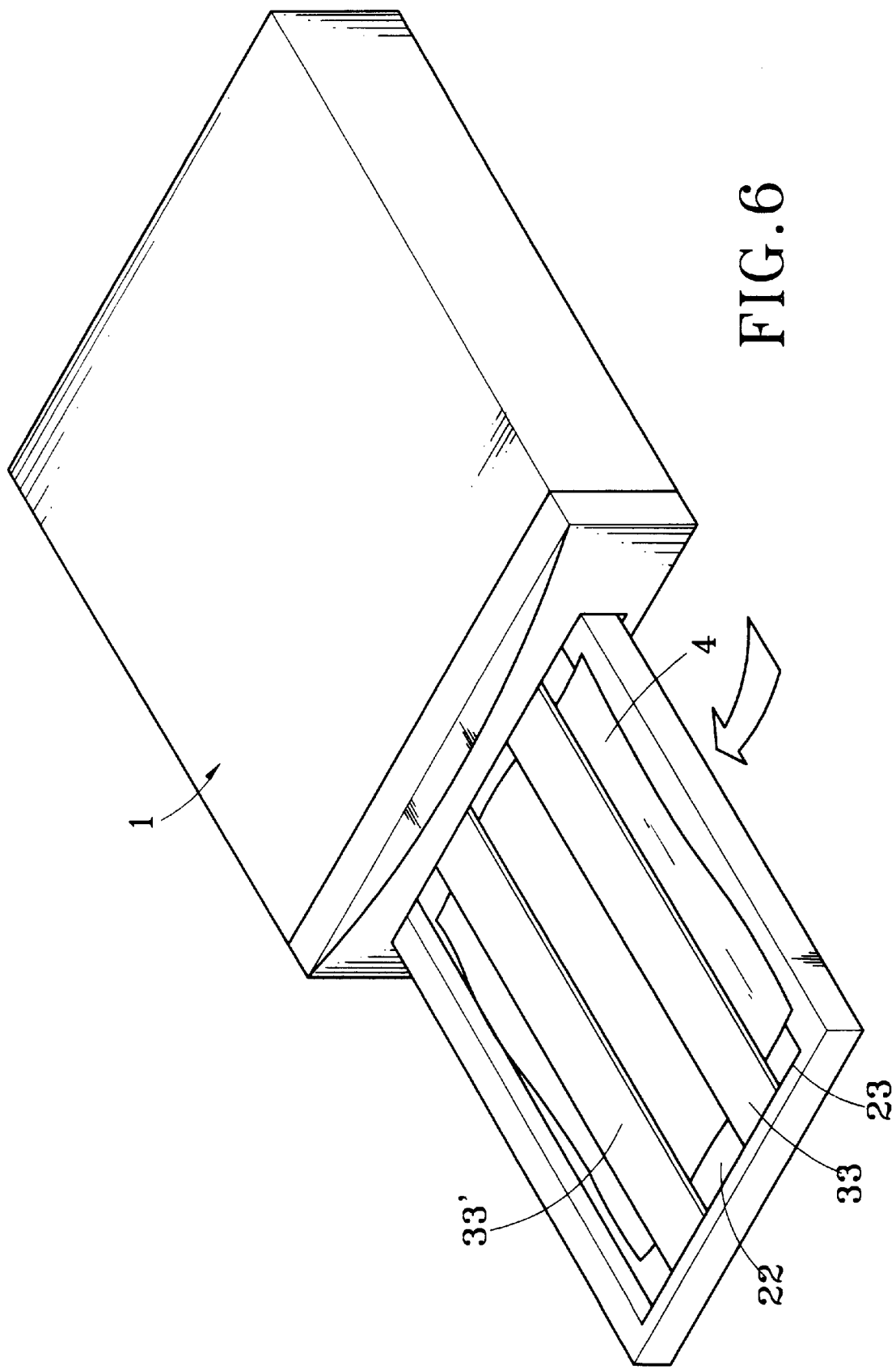
FIG. 6 is the perspective view of the third embodiment of the invention.

Please refer to FIG. 5 which is the perspective view of the second embodiment of the invention. The covering means 3 of the document tray includes a plurality of flat planks 33 and 33' which are parallel to the front end 23 of the supporting part 2. Please refer to FIG. 6 which is the perspective view of the third embodiment of the invention. The covering means 3 of the document tray includes a plurality of flat planks 33 and 33' which are perpendicular to the front end 23 of the supporting part 2. These flat planks 33 and 33' can be mounted to and dismounted from the supporting part 2 with a screw. Also, these flat planks 33 and 33' can be rigidly sealed to the supporting part 2. In the case that the flat planks 33 and 33' can be mounted to and separated from the supporting part 2, the preferred flat planks 33 and 33' have a salient 330 at each of its shorter side, which the salient 330 is engaged with each one of the recesses 20 and 20' of the supporting part 2. The flat planks 33 and 33' are not fixed on the supporting part 2. Similar to the first embodiment, there is also a space between the flat planks 33, 33' and the bottom 22 of the supporting part 2 to contain the document 4. In addition, the document 4 can be inserted into the document tray through the space between the flat planks 33 and 33'.

It is noted that the improved document tray for scanners described above are the preferred embodiments of the present invention only for the purposes of illustration and are not intended as a definition of the limits and scope of the invention disclosed. Any modifications and variations that may be apparent to a person skilled in the art are intended to be included within the scope of the present invention.

What is claimed is:

1. A document tray of an optical scanner, comprising:

a supporting part for holding a document;

covering means provided on the supporting part, which does not need to be opened but can fix the document on the supporting part; and a space formed between the covering means and the supporting part for loading and unloading the document;

wherein the covering means is a flat plank further comprising a salient at each side that is engaged with a recess located at each inner side of the supporting part, making the covering means removable from the document tray.

2. The document tray of an optical scanner as claimed in claim 1 wherein the plank can move forward and backward on the supporting part.

3. The document tray of an optical scanner as claimed in claim 1 wherein the covering means is cohered on the supporting part.

4. A document tray of an optical scanner, comprising:

a supporting part for holding a document;

covering means set on the supporting part, which does not need to be opened but can fix the document on the supporting part; and a space formed between the covering means and the supporting part for loading and unloadng the document;

wherein the covering means comprises a plurality of flat planks that are furnished either vertically or in a parallel direction on the supporting part.

5. The document tray of an optical scanner as claimed in claim 4 wherein the planks can move forward and backward on the supporting part.

6. The document tray of an optical scanner as claimed in claim 4 wherein the covering means is cohered on the supporting part.

* * * * *

UNITED STATES PATENT AND TRADEMARK OFFICE
CERTIFICATE OF CORRECTION

PATENT NO. : 5,988,779

DATED : November 23, 1999

INVENTOR(S) : HSIN-HUNG TU, et al.

It is certified that error appears in the above-identified patent and that said Letters Patent is hereby corrected as shown below:

On the title page, Item [54] should read --DOCUMENT TRAY OF BUILT-IN SCANNER--.

Signed and Sealed this

Twenty-ninth Day of August, 2000

Attest:

Q. TODD DICKINSON

*Attesting Officer*     *Director of Patents and Trademarks*